United States Patent [19]

Schechter et al.

[11] Patent Number: 5,050,910

[45] Date of Patent: Sep. 24, 1991

[54] FRAGRANCE-RELEASING INSERT FOR A MAGAZINE

[76] Inventors: Sheldon Schechter, 105 Kingsberry Dr., Somerset, N.J. 08873; Kevin P. Gatta, 204 Washington Ave., Brooklyn, N.Y. 11205

[21] Appl. No.: 379,932

[22] Filed: Jul. 13, 1989

[51] Int. Cl.[5] .......................... B32B 7/00; B42D 15/00

[52] U.S. Cl. ....................................... 283/105; 283/56; 283/117; 428/905

[58] Field of Search ......................... 283/105, 56, 117; 206/581, 232, 831; 428/138, 905

[56] References Cited

U.S. PATENT DOCUMENTS

| | | | |
|---|---|---|---|
| 2,303,073 | 11/1942 | Brown | 428/905 |
| 2,717,174 | 9/1955 | Casanovas | 428/905 |
| 3,016,308 | 1/1962 | Macaulay . | |
| 3,494,505 | 2/1970 | Huebner et al. | 428/905 |
| 3,516,846 | 6/1970 | Matson . | |
| 3,516,941 | 6/1970 | Matson . | |
| 3,570,139 | 3/1971 | Ladd et al. | 428/905 |
| 3,623,659 | 11/1971 | Malerson . | |
| 4,058,434 | 11/1977 | Vincent et al. . | |
| 4,145,001 | 3/1979 | Weyenberg et al. | 428/905 |
| 4,186,743 | 2/1980 | Steiger . | |
| 4,201,404 | 5/1980 | Charbonneau et al. . | |
| 4,251,386 | 2/1981 | Saeki et al. . | |
| 4,254,910 | 3/1981 | Martin | 428/905 |
| 4,484,768 | 11/1984 | Norfleet . | |
| 4,487,801 | 12/1984 | Turnbull et al. . | |
| 4,493,869 | 1/1985 | Sweeney et al. . | |
| 4,543,139 | 9/1985 | Freedman et al. | 206/831 |
| 4,606,956 | 8/1986 | Charbonneau et al. . | |
| 4,661,388 | 4/1987 | Charbonneau . | |
| 4,720,417 | 1/1988 | Sweeney et al. . | |
| 4,876,136 | 10/1989 | Chang et al. | 428/138 |
| 4,880,690 | 11/1989 | Szycher et al. | 428/905 |
| 4,889,755 | 12/1989 | Charbonneau | 428/42 |

FOREIGN PATENT DOCUMENTS 1156725 7/1969 Switzerland .

*Primary Examiner*—Frank T. Yost
*Assistant Examiner*—Hwei-Siu Payer
*Attorney, Agent, or Firm*—Amster, Rothstein & Ebenstein

[57] ABSTRACT

A fragrance-releasing insert for a magazine, book or the like comprises a leaf having four at least partially overlapping sheets. At least an adjacent two of the sheets including the first and second sheets are substantially cut through to define a first portion of a removable unit, and at least an adjacent two of the sheets including the second and third sheets are at least partially cut through to define a second portion of the removable unit. The sheets of the second portion are of one-piece integral construction with corresponding ones of the sheets of the first portion so that the first and second portions are removable from the remainder of the leaf as the removable unit. Each of the sheets are secured together outside the periphery of the removable unit, the sheets of the first portion are secured together for movement as a unit, and two of the sheets of the second portion are separably secured together for movement as a unit and for releasing a scent when the two sheets of the second portion are separated from each other.

27 Claims, 4 Drawing Sheets

FIG. 3
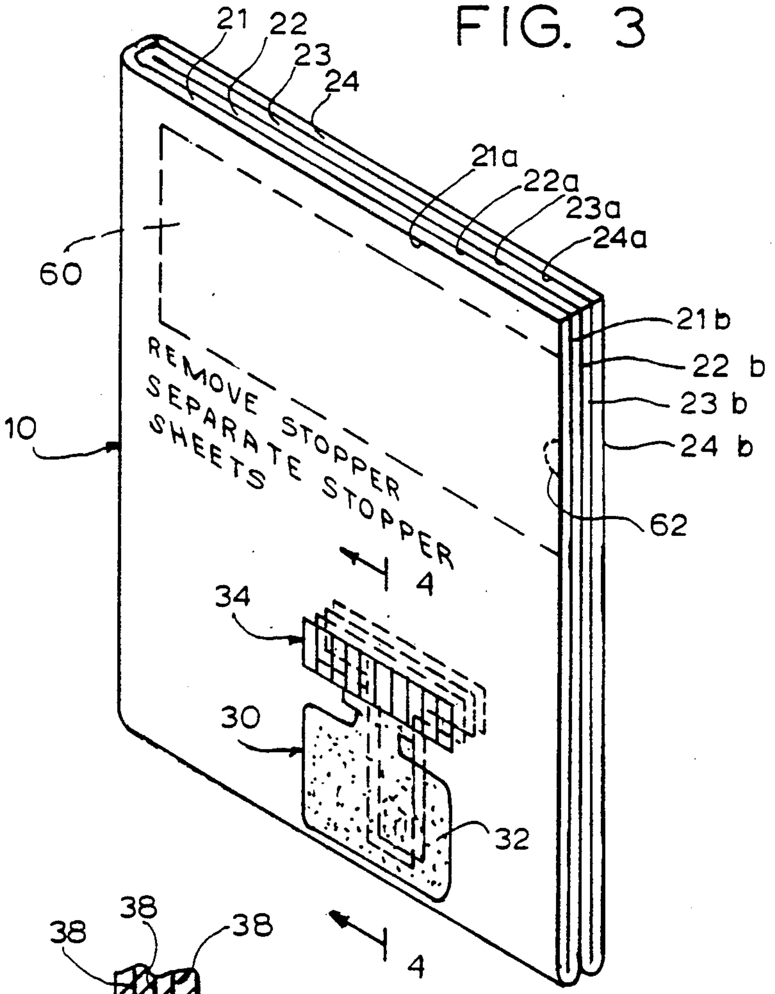
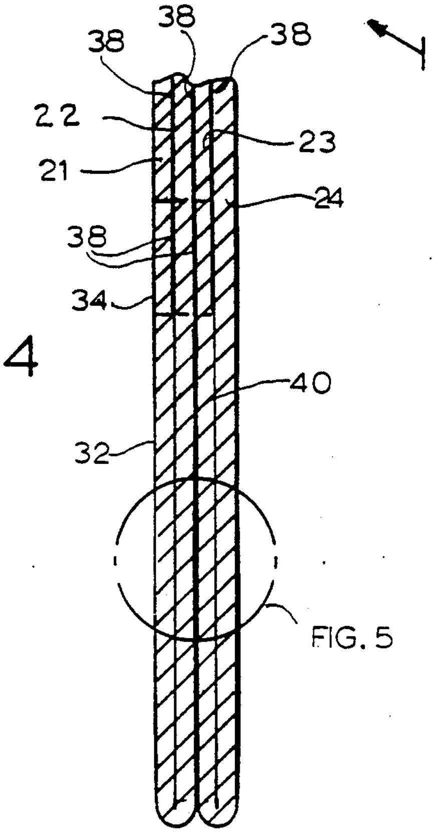
FIG. 4
FIG. 5
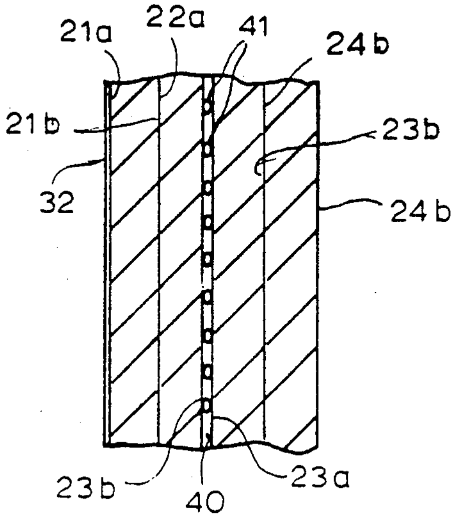

FRAGRANCE-RELEASING INSERT FOR A MAGAZINE

BACKGROUND OF THE INVENTION

The present invention relates to a device including a fragrance-releasing pull-apart sheet and, more Particularly, to such a device which is useful as an insert in a magazine.

Fragrance-releasing pull-apart sheets are well known in the art. See for example U.S. Pat. No. 4,720,417; U.S. Pat. No. 4,661,388; U.S. Pat. No. 4,493,869; U.S. Pat. No. 3,516,846. According to the prior art systems, two surfaces, sheets or opposed faces of a folded single sheet of paper are temporarily bonded together by means of an adhesive with rupturable fragrance-containing microcapsules dispersed therein. The microcapsules are ruptured by pulling apart the sheets so as to cause the microcapsules to rupture and release the fragrance contained therein. A common use of such sheets is in inserts advertising perfumes (including colognes, toilet waters and the like), the inserts being bound into magazines (including books, pamphlets and like reading matter). Such fragrance-releasing inserts have not proven to be entirely satisfactory in use, however.

Because the fragrance-releasing insert is bound into the magazine, once the user separates the temporarily bonded surfaces to rupture the microcapsules and release the fragrance, the fragrance pervades not only the insert, but the entire magazine. At least in those instances where the fragrance is offensive to the user, the user may thereafter put aside the magazine rather than continuing to endure the fragrance. Indeed, the potential negative impact of such an insert on an advertisement disposed on an adjacent page is so great that some publishers require that the advertiser who wishes to use a fragrance-releasing insert must also purchase the adjacent pages, thereby greatly increasing the cost of the advertisement.

Even if the fragrance-releasing advertisement had a detachable fragrance-releasing portion and instructions to remove such detachable portion from the remainder of the insert prior to releasing the scent therefrom, human nature is such that, if the fragrance could possibly be activated without the user going to the minor effort of removing the detachable portion from the remainder of the insert, it would probably be done so. The only way to insure that the detachable portion is removed from the remainder of the insert prior to release of the scent is to ensure that the scent cannot be released except by first removing the detachable portion from the remainder of the insert.

As the most convenient way to form the two overlapping surfaces to be temporarily bonded together by the microcapsule-containing glue is to fold over an edge of a sheet, it is typically required that the fragrance-releasing insert be smaller than the ordinary page of the magazine by at least the width of the fold so that, once the fold is opened to release the fragrance, the insert still does not extend beyond the periphery of the magazine and thus render an untidy appearance to the magazine Thus the advertiser does not get the full "page" of advertising space for which he is paying.

Where advertising text or graphic elements extend over the front surface of the fold of the folded sheet, which front surface becomes the back surface upon unfolding of the sheet to release the fragrance, the text or graphic element of the advertisement is interrupted by release of the fragrance so that a subsequent reader does not receive the intended impact of the advertisement.

Magazines are typically limited to the use of a single fragrance-releasing insert in each issue of the magazine because otherwise the fragrance released by the second-opened insert would be contaminated by the residual fragrance from the first-opened insert.

Accordingly, an object of the present invention is to provide a fragrance-releasing insert which is adapted to be Permanently bound in a magazine but which has a detachable fragrance-releasing portion removable from the remainder of the insert (and hence from the magazine).

Another object to provide such an insert in which the fragrance cannot be released until the detachable portion of the insert is removed from the remainder of the insert.

A further object is to provide such an insert in which removal of the detachable portion does not interfere with the text or graphic features of the insert.

It is also an object to provide such an insert which includes a return postal card of acceptable thickness for mailing.

It is a further object to provide such a return postal card which may be removed from the insert without substantially affecting the appearance thereof.

Yet another object is to provide such an insert including a plurality of such detachable fragrance-releasing portions usable without fear of cross-contamination of the fragrances.

Yet a further object of the present invention is to provide such an insert which is fixedly bound in a magazine, but has a substantial portion thereof, including the fragrance-releasing portion, removable from the remainder of the insert.

Still another object of the present invention is to provide a fragrance-releasing device which may be used independently of a magazine, book or the like.

SUMMARY OF THE INVENTION

It has now been found that the above and related objects of the present invention are obtained in a novel fragrance-releasing insert for a magazine, book or the like. The fragrance-releasing insert comprises a leaf having four at least partially overlapping sheets. At least an adjacent two of the sheets including the first and second sheets are substantially cut through to define a first portion of a removable unit, and at least an adjacent two of the sheets including the second and third sheets are at least partially cut through to define a second portion of the removable unit. The sheets of the second Portion are of one-piece integral construction with corresponding ones of the sheets of the first portion so that the first and second portions are removable from the remainder of said leaf as said removable unit.

Each of the sheets are secured together outside of the periphery of the removable unit, the sheets of the first portion are secured together for movement as a unit, and two of the sheets of the second portion are separably secured together for movement as a unit and for releasing a scent when the two sheets of the second portion are separated from each other.

In a preferred embodiment, the first, second and third sheets (and preferably only these sheets) are substantially cut through to define the first portion, and the second and third sheets (and preferably only these sheets) are at least partially cut through to define the second portion. The exposed side of the first sheet of the first portion depicts a first image and the hidden side of the fourth sheet overlaid thereby depicts a second image, whereby, prior to removal of the removable unit from the remainder of the leaf, the insert presents to view from the front thereof the first image and, after removal of the removable unit from the remainder of the leaf, the remaining insert presents to view from the front thereof the second image. Where the first and second images are substantially the same and are in superposed relationship, removal of the removable unit does not visually alter the appearance of the insert from the front thereof. The removable unit is returnable to the leaf by returning the second and third sheets of the second portion to their original relative disposition and tucking them into the opening between the first and fourth sheets created by their removal. The four sheets may be defined by a single leaf having a first fold and a second fold transverse to the first fold, the first and second folds dividing the leaf into overlapping quarters.

The exposed side of the first sheet preferably depicts an image of an open container closed by a closure, the exposed side of the first sheet of the first portion of the removable unit depicting an image of the closure for the open container and the remainder of the exposed side of the first sheet depicting an image of the open container. Optionally the second portion is disposed above the first portion, the open container image represents an upright perfume bottle, the closure image represents a perfume bottle top, and the second portion of the removable unit presents the appearance of a perfume applicator. Thus removal of the removable unit from the remainder of the leaf appears to be a removal of the bottle top from the bottle and a withdrawal of the applicator from the perfume contents of the bottle. The exposed side of the first sheet may also bear instructions for removal of the removable unit from the remainder of the leaf and separation of the two sheets of the second portion to release the scent.

The securing and releasing means comprises an adhesive composition layer having rupturable microcapsules with a scented liquid within the shell of the microcapsules, the cohesive strength of the layer being less than the strength of the bond between the layer and the two sheets of the second portion of the removable unit, and the tensile rupture strength of the microcapsules being such that cohesive failure of the adhesive results in breakage of the microcapsules. The securing and releasing means is disposed between the two sheets of the second portion for a substantial portion of the length thereof but is absent between the free ends of the two sheets of the second portion, thereby to facilitate separation of the two sheets of the second portion by separation of the unsecured free ends.

In a preferred embodiment providing a return postal card, at least two of the sheets including the second and third sheets define a removable postal card spaced from the removable unit. The outer surfaces of the card are not secured to any sheet not defining the card, each sheet not defining the card having adjacent an edge of the insert a weakened region overlying the card and adapted to be removed with and to facilitate removal of the card from the remainder of the leaf. The areas of the weakened regions of the first and fourth sheets are small relative to the areas of the first and fourth sheets, respectively, and the appearances of the first and fourth leafs are substantially unchanged by removal of the card and the weakened regions from the remainder of the leaf. The second and third sheets together define the card, the portions of the second and third sheets together defining the card being adhered together to form a double sheet thickness. The weakened regions are adjacent free edges of the sheets.

In another preferred embodiment providing a multipage catalog, each of three consecutive sheets, including one of the first and fourth sheets, has at least one line of severance defining with at least one edge of the insert all but one side of three turnable sheets of a multipage catalog. The catalog is spaced from the removable unit and has its sheets adhered together at the one side. The catalog is preferably a six page catalog excluding the outer pages of the insert, but including the inner page of the other of the first and fourth sheets. The three consecutive sheets are typically the second, third and fourth sheets and each may have an additional line of severance intermediate the one side of the catalog sheets and the remainder of the insert, whereby the catalog is removable from the remainder of the insert.

The present invention also encompasses the combination of the insert and a magazine, book or the like, the insert being bound within the magazine, book or the like by an edge thereof.

The present invention further encompasses an insert wherein the portion of the first sheet bearing the open container and closure images and the portions of the other pages overlapped thereby are separable from the remainder of the leaf to form a separate and distinct mechanically functioning entity. The image-bearing and overlapped portions are easily separable along a line of severance from the remainder of the leaf.

Finally, the present invention encompasses a scent-containing sample comprising four at least Partially overlapping sheets. The first, second and third sheets are at least partially cut through to define a first portion of a removable unit, the second and third sheets are at least partially cut through to define a second portion of a removable unit. The second and third sheets of the second portion are of one-piece integral construction with the second and third sheets of the first portion so that the first and second portions are removable from the remainder of the sample as a unit. The first, second, third and fourth sheets are secured together outside of the periphery of the removable unit, the first, second and third sheets of the first portion are secured together for movement as a unit, and the second and third sheets of the second portion are separably secured together for movement as a unit and for releasing a scent when the second and third sheets of the second portion are separated from each other. The four sheets may be formed from a single leaf having a first fold and a second fold transverse to the first fold, thereby to define the four sheets.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 3 is an isometric view of the blank of FIG. 2 folded a second time transverse to the first fold, to form the insert;

FIG. 4 is a fragmentary sectional view taken along the line 4—4 of FIG. 3 and in the direction of the arrows;

FIG. 5 is a fragmentary sectional view, to a greatly enlarged scale, of the circled portion of FIG. 4;

FIG. 10 is an isometric view of a free-standing third embodiment of the present invention not intended for use in connection with a magazine, book or the like.

Figure 2:
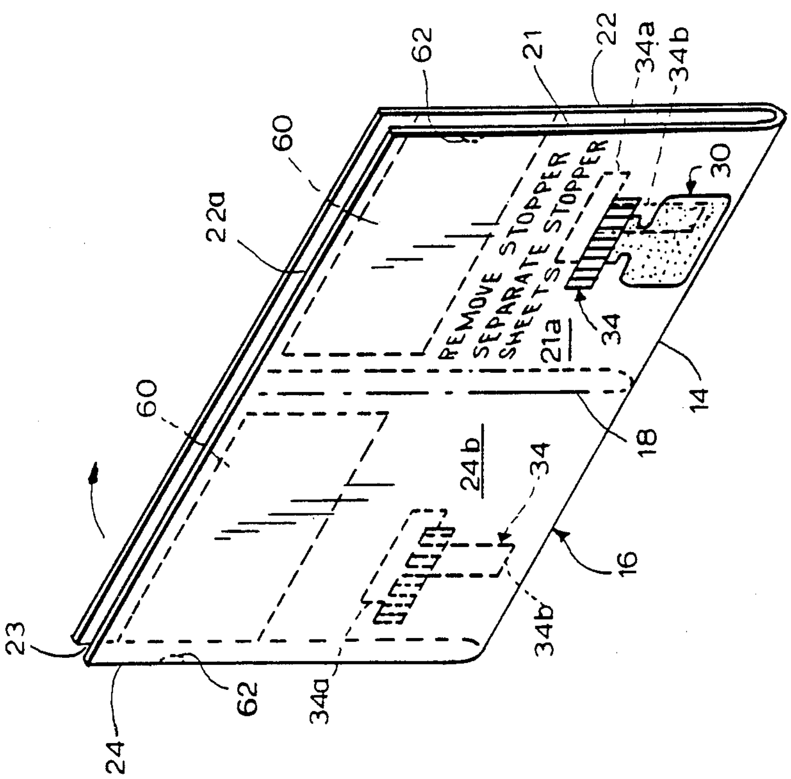
FIG. 2 is an isometric view of the blank of FIG. 1 folded once.

In the drawing, foldlines have been indicated in phantom line, hidden lines (whether foldlines or die cut lines) have been indicated by dotted lines with long dashes, and die cut lines have been indicated by dotted lines with short dashes.

DETAILED DESCRIPTION OF THE PREFERRED EMBODIMENTS

Figure 1:
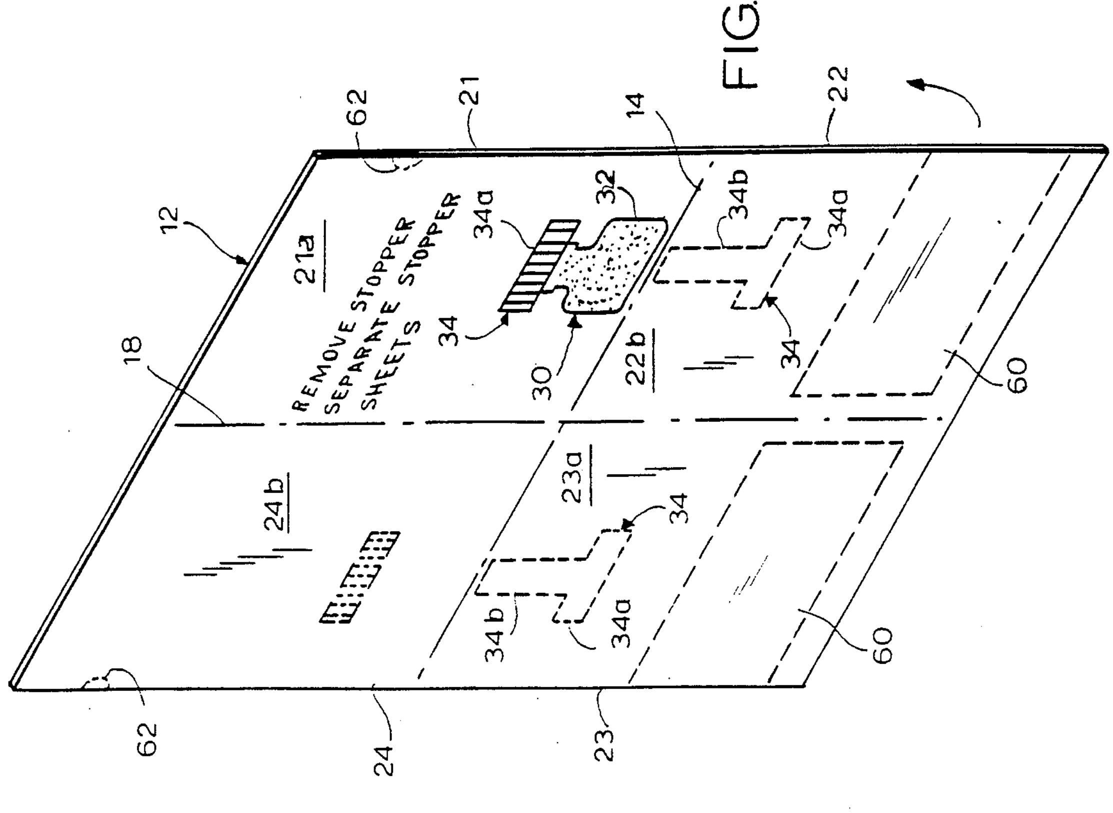
FIG. 1 is an isometric view of the blank from which an insert according to the present invention may be made.
Figure 6:
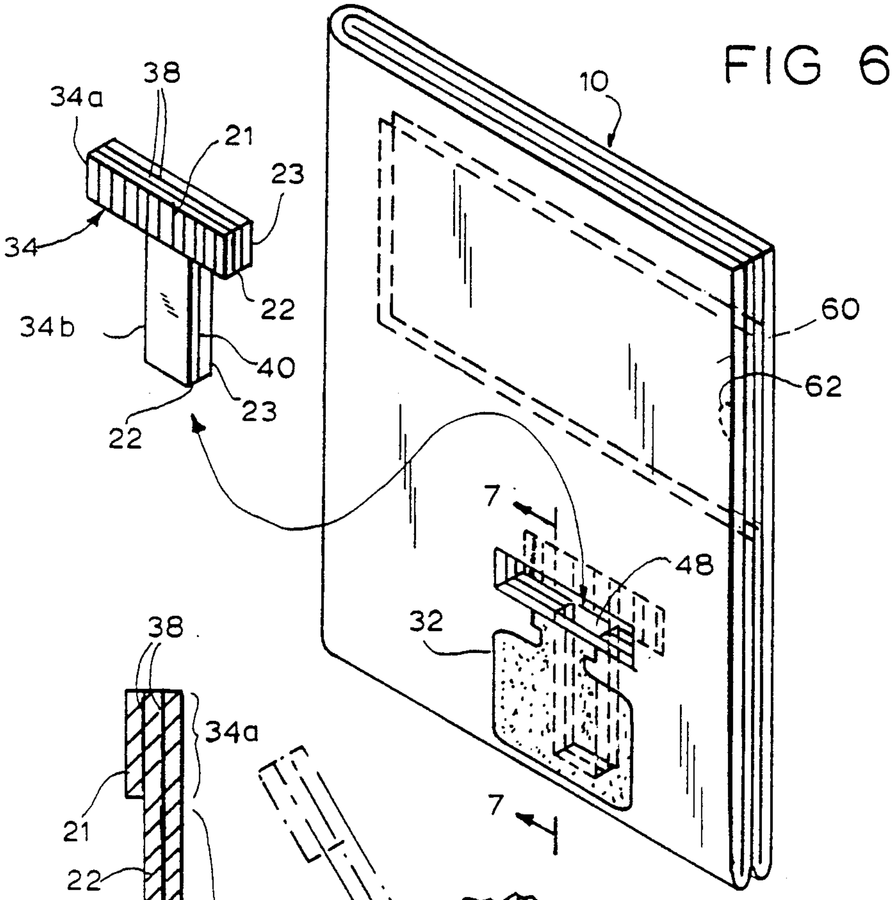
FIG. 6 is an isometric view of the insert with the detachable stopper portion removed.

Referring now to the drawing, and in particular to FIGS. 1-3 thereof, FIG. 3 illustrates a fragrance-releasing insert according to the present invention, generally designated by the reference numeral 10. The insert 10 is a leaf which may be formed from a blank, generally designated 12, as illustrated in FIG. 1. The blank 12 is folded twice, with the two fold lines being transverse to one another, in order to form the insert. For example, the blank 12 may be first folded along a horizontal foldline 14 to form an intermediate generally designated 16, as illustrated in FIG. 2, and then folded about a vertical foldline 18 to form the doubly folded leaf or insert 10, as illustrated in FIG. 3. Alternatively, the insert 10 may be formed by four separate sheets or even a pair of once fold sheets.

The insert 10 includes four at least partially overlapping sheets. identified in order from the front of the insert to the rear of the insert as sheets 21, 22, 23 and 24. Each sheet 21, 22, 23 and 24 has a front side or surface 21*a*, 22*a*, 23*a*, 24*a*, respectively, and a rear side or surface 21*b*, 22*b*, 23*b*, 24*b*, respectively. Each side or surface corresponds to a page of the insert with the outer pages 21*a* and 24*b* being exposed, and the remainder of the pages at least initially concealed or hidden from view.

The exposed front page 21*a* bears the printed image of a closed container, typically a stoppered perfume bottle generally designated 30, including an upright open-topped container 32 and a closure or stopper 34. The illustrated stopper 34 is in the form of a "T" with the horizontal element or gripping end 34*a* being visible and the vertical element or scent applicator 34*b* being hidden within the container 32. While the stopper 34 is described and illustrated herein as being T-shaped and composed of a visible upper horizontal element 34*a* and a hidden lower vertical element 34*b*, it will be appreciated that the stopper 34 may be of different configurations and dimensions; for example, the stopper 34 may be of rectangular, circular or any other configuration, with any visible portion thereof being designated as the element 34*a* and any hidden portion thereof being designated the element 34*b*. Clearly, a variety of other images may be used on front page 21*a* instead of the perfume bottle 30, the only limitation being the imagination of the art designer. For example, where the advertisement is to emphasize the rich aroma of a coffee by providing the coffee aroma as the fragrance, the perfume bottle image 30 may be replaced by that of a steaming cup of coffee having a spoon therein, with the cup functioning as the open container 32 and the spoon as the stopper 34. In any case, the configuration, dimensions and placement of the image 30 may be varied greatly without departing from the spirit of the present invention.

In front sheet 21, while the open container 32 is simply a printed image on outer surface 21*a*, the top, lateral sides and the end-portions of the bottom of the horizontal element 34*a* of the stopper 34 are at least die cut (so that it is still connected to the sheet by one or more uncut portions called nicks), and preferably completely cut through the thickness of the sheet 21 (so that it is completely severed from the sheet). In intermediate sheets 22 and 23, the horizontal element 34*a* of stopper 34 is aligned with the corresponding element 34*a* on sheet 21, and has the same portions thereof die cut and preferably totally cut through. The vertical element 34*b* is die cut about its periphery (except where it contacts the horizontal element 34*a*) but with easily severed nicks connecting it to the remainder of the sheet. Thus the stopper 34 of sheets 22 and 23 is easily removable from the sheets, yet, until forcibly displaced, remains in position due to the nick connections between at least the vertical element 34*b* and the remainder of the sheets. In rear sheet 24 no portion of stopper 34 is die cut or cut through. However. surface 24*a* thereof preferably contains in an area (illustrated in dotted line in FIG. 1) corresponding to the horizontal element 34*a* of stopper 34, text or graphics corresponding to those found on the front of the horizontal element 34*a* on surface 21*a* of front sheet 21, for reasons which will become apparent hereinafter.

Referring now to FIGS. 4-7 in particular, the various sheets 21, 22, 23 and 24 have their adjacent surfaces adhered together with conventional glues 38 (such as hot-melt adhesives) as follows: surfaces 21*b* and 22*a* and surfaces 22*b* and 23*a* except for the vertical element 34*b*, and surfaces 23*b* and 24*a* except for the stopper 34. The surfaces 22*b* and 23*a* are temporarily bonded together in the area of vertical element 34*b*, by means of a special adhesive 40 having fragrance-releasing rupturable microcapsules 41 (see FIG. 5) dispersed therein. The microcapsule-containing glue 40 extends for a substantial portion of the full length of the vertical element 34*b*, but preferably stops short of the lower extent thereof so as to facilitate the separation of the sheets 22, 23 of the vertical element 34*b* by enabling the unglued bottom ends to be easily grasped and initially displaced relative to one another. The relative physical properties of the sheets, adhesive, microcapsules and the binding forces amongst them are selected so that the microcapsules 41 are ruptured by pulling apart the vertical elements 34*b* of sheets 22, 23, thereby causing the microcapsules to rupture and release the scented ingredients contained therein. The cohesive strength of the adhesive composition layer having the rupturable microcapsules (with a scented liquid within the shell of the microcapsules) is less than the strength of the bond between such layer and the vertical elements 34*b* of sheets 22, 23, the tensile rupture strength of the microcapsules 41 being such that cohesive failure of the adhesive 40 results in breakage of the microcapsules 41. Special microcapsule-containing adhesive layers of this type are well known in the art (see, for example, U.S. Pat. No. 3,516,846; U.S. Pat. No. 4,186,743; U.S. Pat. No. 4,487,801; U.S. Pat. No. 4,606,956; U.S. Pat. No. 4,661,388; and U.S. Pat. No. 4,720,417) and thus need not be further described herein.

The conventional glue or adhesive 38 (i.e., the glue not containing microcapsules) is shown as a thick line in FIGS. 4–7, but omitted from all other figures for clarity of illustration. The special microcapsule-containing glue 40 is also shown in FIGS. 4–7 (with the microcapsules 41 therein shown only in the enlarged view of FIG. 5), but omitted from all other figures for clarity of illustration Referring now to FIGS. 6–7 in particular, it will be appreciated that the detachable stopper 34, removable as a unit from the remainder of the insert 10, is comprised of three sheets 21, 22, 23 in its horizontal element 34*a*, but only two sheets 22, 23 in its vertical element 34*b*. Further, while it is a conventional glue 38 which secures the sheets 21, 22, 23 of the horizontal element 34*a* together, it is the special microcapsule-containing glue 40 which secures the sheets 22, 23 of the vertical element 34*b* together. While it is, of course, possible to use the special microcapsule-containing 40 to secure together the sheets of the horizontal element 34*a* or even the remainder of the insert 10, the special microcapsule-containing glue 40 is typically more expensive than a conventional glue 38, such as a hot melt glue, and thus is used only where the scent-releasing function is desired.

In order to remove the stopper 34 from the remainder of insert 10, one may simply use a finger nail to pull forward the horizontal element 34*a* which is preferably completely separate from the remainder of the insert except as it is attached to the vertical element 34*b*. If necessary, the insert 10 may be flexed slightly to raise the horizontal element 34*a*, partially or totally above the plane of the adjacent portion of the insert and thereby render it accessible for grasping. Once the horizontal element 34*a* is grasped, the vertical element 34*b* may be pulled upwardly and outwardly, as shown in phantom line in FIG. 7, to break any nicks connecting the vertical element 34*b* with the remainder of the insert and thus enable easy removal of the entire stopper 34 from the remainder of the insert. The number, width and placement of the nicks connecting the vertical element 34*b* and the remainder of the insert will determine the ease with which the stopper 34 is removed from the remainder of the insert and will generally be selected to enable stopper 34 to be integrated with the remainder of the insert sufficiently that the insert may be handled as a single unit before, during, and after insertion in the magazine, while still permitting the stopper 34 to be easily removed from the remainder of the insert by a single forceful tug in the right direction.

Surface 21*a* of the insert may contain, in addition to the image of the container 30, a variety of other text and graphical elements appropriate for an advertisement or the like. Typically the surface 21*a* will include appropriate instructions for removal of the stopper 34 from the insert and activation of the stopper 34 to release the fragrance by separation of the sheets 22, 23 forming the vertical element 34*b*.

Removal of the stopper 34 from the insert 10 creates an open-topped pocket 48 (see FIG. 6) defined in the front by surface 21*b*, in the rear by surface 24*a*, and at the bottom by portions of sheets 22, 23. As this pocket 48, either alone or in conjunction with a cover for the compartment formed by the adjacent portions of sheets 21, 22 and 23, suffices to hold stopper 34 within the insert absent a displacing force, there may originally be a total line of severance between the stopper 34 and the remainder of the insert, or, at the least, the number of nicks used to connect the stopper 34 and the remainder of the insert may be greatly reduced without danger of the stopper 34 becoming prematurely inadvertently displaced from the remainder of the insert 10. In fact, after the stopper 34 has been removed and deployed to release the scent, it may optionally be reinserted into the remainder of the insert by guiding the vertical element 34*b* back into compartment 48 and then the horizontal element 34*a* back into its original location. While reintroduction of the used stopper 34 into the remainder of the insert 10 may result in the contamination of the remainder of the insert 10 and the magazine itself with the released scent, in certain instances ecological considerations may mandate that the used stopper 34 be returned to the insert rather than discarded as litter.

While the insert 10 has been shown and described as having only a single detachable fragrance-releasing stopper 34, clearly a single given insert may contain a plurality of different detachable stoppers 34, each containing a different scent, and even a plurality of different containers 30—in the same or different orientations—each with its own detachable stopper 34. Whereas conventionally a single insert, and preferably a single magazine, necessarily contained only one scent-releasing element in order to prevent the scent of one scent-releasing element from being merged with the scent of another scent-releasing element, the present invention permits a variety of different scent-releasing elements (i.e., the stoppers 34) to be used in a single magazine, and even in a single insert, as the scent cannot be released by the scent-releasing element until removal of the scent-releasing element from the remainder of the insert and hence the magazine, thereby automatically eliminating any possible cross-contamination of scents (i.e., merging of one scent with another scent). Similarly, as the scent-releasing element cannot release the scent until the stopper 34 is removed from the insert 10 and the vertical elements 34*b* exposed, the released scent does not contaminate the insert 10, let alone the entire magazine, thus solving a major problem of the prior art scent-releasing inserts. Indeed, because the released scent does not contaminate the remainder of the magazine, it is expected that the current requirement of publishers, that the advertiser using a scent-releasing insert purchase adjacent pages of the magazine, will be dropped.

The surface 21*a* of the horizontal element 34*a* and the portion of surface 24*a* aligned therewith are shaded similarly in order to indicate that the graphic and textual matter in these areas of the surfaces 21*a* and 24*a* are preferably identical. Thus, removal of the stopper 34 from the remainder of the insert does not alter the appearance of the insert from either the front or back thereof, as the design or textual matter initially on front surface 21*a* of the horizontal element 34*a* of the stopper 34 remains visible from the front of the insert 10 by virtue of its repetition on the previously overlaid and now exposed area of surface 24*a*. If desired, however, the graphic and textual matter on the appropriate overlying areas of surfaces 21*a* and 24*a* may differ so that different messages appear before and after removal of the stopper 34 from the insert 10. For example, the surface 21*a* of horizontal element 34*a* may contain directions for removal of the stopper 34 and its use to release a fragrance, while the portion of surface 24*a* aligned with the horizontal element 34*a* may indicate that, as the stopper 34 has been removed, the user may obtain a further specimen of the scent by contacting the advertiser, either through a telephone number or a special request card.

Figure 8:
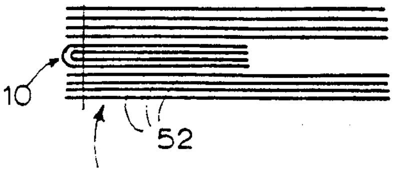
FIG. 8 is a schematic representation of a magazine containing the insert.

Referring now to FIG. 8, therein illustrated schematically is an insert 10 fixed by its quadruply folded edge into a magazine, book or the like, generally designated 50, as one of its pages 52. The insert 34 may be disposed at the front, rear, or anywhere between the pages 52 of the magazine 50. The insert 34 may be bound in the magazine 50 by any of the conventional techniques well known to those skilled in the publishing art for placing inserts in a magazine, regardless of whether or not such binding techniques involves trimming of the insert edges so as to remove the folds 14, 18. The insert 10 may be of the same area as the magazine pages 52 or smaller, as illustrated.

Advertisers often desire to provide the reader of an advertisement with a pre-addressed postage-paid return postal card which the reader can use to obtain additional information regarding the product. This is especially true in the case of fragrance-releasing advertisements where the scent may already have been released by a prior reader of the magazine before the current reader has had an opportunity to sample the same. Thus the return postal card might contain a preprinted request for an additional sample to be sent. Unless an insert is composed of thicker paper than is customarily used for a book or magazine, however, the paper is not sufficiently thick for use as a postal card in conformance with the applicable requirements of the U.S. Postal Service. According to the present invention, however, a return postal card may be provided even though the individual sheets of the insert are no thicker than the ordinary pages of a magazine or book.

Referring now to FIGS. 1-3 and 6, sheets 22 and 23 are die cut in a location removed from the stopper 34 to define a return postal card 60. Preferably the return postal card 60 has at least one edge (here illustrated as being a short edge, but optionally being a long edge), and preferably two edges (preferably a long edge and a short edge) defining a free edge of the insert 10—that is, an edge or edges which are not used in binding of the insert into the magazine 50. The adjacent surfaces of the postal card 60 (that is, surfaces 22*b* and 23*a* thereof) are glued together with conventional adhesive 38 in order to provide a suitable double thickness for meeting the requirements of the U.S. Postal Service. The remaining surfaces of the double thickness, two layer postal card 60 (that is, the surfaces 22*a* and 23*b*) are devoid of glue (and thus not bound to the outer sheets not forming the postal card 60) and typically are printed with an address of the advertiser or manufacturer of the product and prepaid postage on one side and appropriate text and space for user-added text on the other side.

In order to facilitate removal of the postal card 60 from the remainder of the insert 10, the front and back sheets 21, 24 of the insert are die cut, each on a free common edge with the postal card 60, in superimposed or aligned relationship to define semi-circular die cut portions 62 which are small in area relative to the outer sheets 21, 24. The reader can squeeze the die cut portions 62 between two fingers and, by pulling them out from the remainder of the insert 10, also remove the double thickness postal card 60 as well. The removed die cut portions 62 are then discarded. It will be appreciated that removal of the double thickness postal card 60 from the remainder of the insert does not deface or alter the visible portions of the insert (that is, the front surface 24*a* or rear surface 21*b*) except to the very minor extent caused by the removal of the die cut portions 62.

While generally two glued sheets of magazine or book stock paper will suffice to make a postal card meeting U.S. Postal Service requirements for thickness, if desired, the thickness of the postal card may be increased by appropriately die cutting one of the outer sheets 21, 24 of the insert to form another postal card layer (not shown) and gluing the adjacent surface of that postal card layer to the adjacent layer of the two layer postal card to form a triple thickness three layer postal card. In this instance any text or graphic matter disposed on the outer surface 21*a*, 24*b* of the removed surface portion of the outer sheet 21, 24 used to form the postal card may be repeated on the aligned portion of the inner surface 24*a*, 21*b* of the other outer sheet 24, 21 so that removal of the postal card does not destroy the message imparted to the reader. Alternatively, the text or graphic matter on the inner surface 24*a*, 21*b* of the other outer sheet 24, 21 may be different, perhaps advising the reader how to reach the advertiser by telephone since the postal card has already been removed.

If a still further thickness is desired for the postal card, and the advertiser is willing to have an entire segment of the insert visibly removed therefrom, the other outer sheet 24, 21 may also be appropriately die cut to provide yet another postal card layer and the surface 24*a*, 21*b* thereof glued to the adjacent postal card layer to form a quadruple thickness, four layer postal card. Where a three ply postal card is formed, only one outer sheet will contain a die cut portion 62; where a four ply postal card is formed, no die cut portion 62 need be provided. Where three or four ply postal cards are being formed, preferably they are positioned in a corner of the insert, with one short side and one long side thereof defining Portions of the free edges of the insert in order to facilitate removal of the postal card from the remainder of the insert with a minimum of effort.

The insert 10 is simple to use, and suitable instructions for its use by a reader may be provided as part of the text and design elements on the front surface 21*a*. The advertising matter on surface 21*a* may analogize removal of the stopper 34 from the compartment 32 to removal of the stopper of a perfume bottle, the vertical element 34*b* being an applicator for applying the scent once it has been appropriately activated. The instructions may advise the reader that he has only to lift the horizontal element 34*a*, bending the insert 10 appropriately if needed, and exert a forceful tug thereon along an axis aligned with and in the direction away from the vertical element 34*b*. After the stopper 34 is thus removed from the remainder of the insert, the free ends at the bottom of the vertical element 34*b* are exposed and may be separately grasped and pulled apart to rupture the microcapsules 41 of the special adhesive layer 40, thereby to release the fragrance. The textual matter on surface 21*a* may advise the reader either to discard the used stopper 34 or to replace it within the pocket 48 formed by its removal from the remainder of the insert. Additionally, there may be instructions for removal and use of the postal card 60 from the remainder of the insert 10, either by directly grasping and pulling on the postal card, indirectly through use of the die cut weakened regions 62, or combinations thereof.

Figure 7:
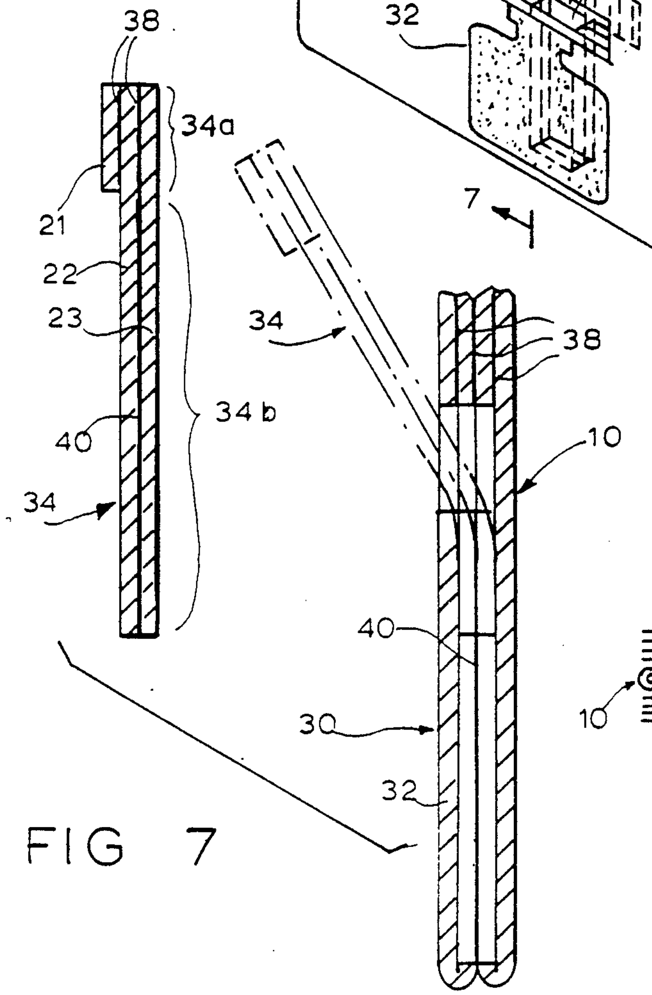
FIG. 7 is a fragmentary exploded sectional view, taken along the line 7—7 of FIG. 6, with the removable portion shown in phantom line in an intermediate stage of its removal from the remainder of the insert.
Figure 9:
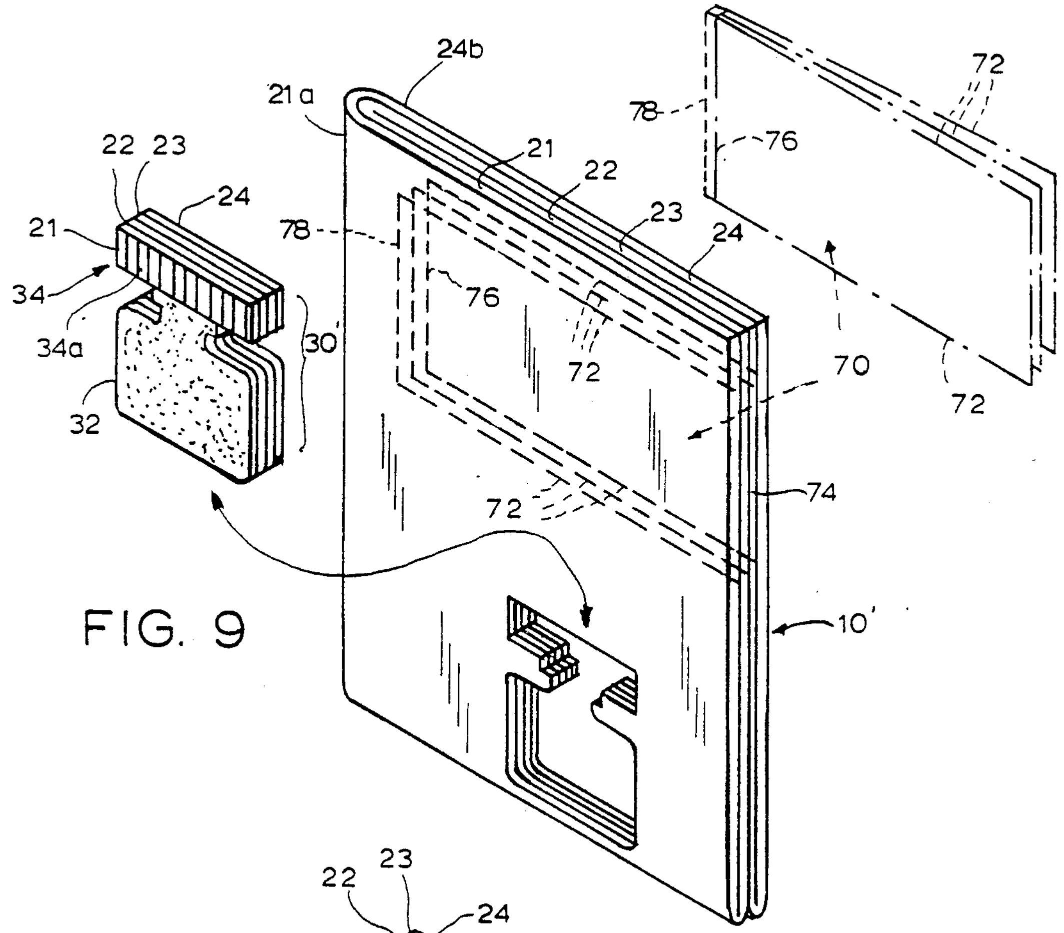
FIG. 9 is an isometric view of a second embodiment of the present invention wherein the insert includes a detachable member, including the detachable stopper portion, and a detachable multipage catalog, such detachable member being shown removed from the remainder of the insert and such detachable catalog being shown in phantom line removed from the remainder of the insert.

Referring now to FIG. 9, therein illustrated is a second embodiment 10' of the present invention. The elements of the second embodiment 10' which are similar in structure and function to elements of the first embodiment 10 are identified by the same numerals. The second embodiment 10' differs from the first embodiment 10 in that a substantial portion of the insert 10', including the detachable stopper 34, is detachable along a die cut line of severance and removable from the remainder of the insert. Thus, the entire representation on page 21 of the closed container 30, including the open container 32 and removable stopper 34, and the overlapped or superimposed portions of the other pages 22, 23, 24 are die cut relative to the remainder of the insert 10', and thus easily detachable as a four-ply unit 30' from the remainder of the insert 10'. The detachable unit 30', once removed from the remainder of insert 10' constitutes a separate and distinct mechanically functioning entity having its own detachable and removable fragrance-releasing stopper 34. This enables the advertiser to convey to the reader not only the two-dimensional sense of a perfume bottle, but also to a limited degree the three-dimensional sense of a perfume bottle, something the reader can actually remove from the insert and hold in his hands. The functioning of the embodiment 10' is similar to that of embodiment 10 except that the detachable stopper 34 is removable from the open container 32 without the bending required in the first embodiment (as shown in FIG. 7). Accordingly, whereas the microcapsule-containing glue 40 of the first embodiment 10 must be sufficiently flexible to enable at least some slight bending of the vertical element 34*b*, the microcapsule-containing glue 40 of the second embodiment 10' may optionally be totally non-flexible. It will be appreciated, however, that while it is contemplated that the entire representation of the closed container 30' will be removed from the remainder of the insert 10' prior to removal of the stopper 34 from that closed container 30', the user retains the option of removing the stopper 34 while the container 30' is still attached to the remainder of the insert 10'.

The second embodiment 10' of the present invention also differs from the first embodiment 10 in that, instead of the insert 10' providing a removable postal card 60, it provides a multipage catalog generally designated 70. It will be appreciated that the second embodiment 10' may be provided with a removable postal card 60 instead of the catalog 70, just as the first embodiment 10 may be provided with a catalog 70 in place of the removable postal card 60. Indeed, when the size of the insert is sufficient for the purpose, either embodiment of the insert may include both a removable postal card 60 and a multipage catalog 70. In any case, the catalog 70 is necessarily spaced from the removable stopper 34 as well as any removable postal card 60.

In order to form a multipage catalog 70, each of three consecutive sheets of the insert, including one of the first and fourth sheets 21, 24, have two lines of severance 72 (e.g., perforated or die cut lines) extending from an edge 74 of the insert to define a pair of opposed sides of the catalog sheet. Preferably the three consecutive sheets are the second, third and fourth sheets 22, 23, 24 so as not to interfere with the appearance of the insert 10' from the front thereof. The lines of severance 72 and the insert edge 74 joining the lines of severance 72 extend about three sides of the catalog sheets, which catalog sheets remain adhered together at the fourth side 76, so as to allow turning of the catalog sheets once the opposed pair of sides of the three catalog sheets have been fully separated from the remainder of the insert 10' along the lines of severance 72. Except for a line of adhesion binding the fourth side 76 of the three catalog sheets together, the opposing surfaces of the turnable catalog sheets 22, 23, 24 are devoid of any glue 38 within the periphery of the catalog so as to leave the catalog sheets 22, 23, 24 turnable with respect to one another, like the pages of a book.

The catalog 70 may be contained entirely within the insert—that is, be a six page catalog excluding the outer pages 21*a*, 24*b* of the insert and including the inner pages 21*b*, 24*a* of the outer sheets 21, 24 and the four pages therebetween 22*a*, 22*b*, 23*a*, 23*b*. Of course, if desired, the outer page of the turnable outer sheet (here illustrated as 24*b*) may also be made a part of the catalog, thereby providing a seven page catalog.

While the catalog 70 is illustrated as having its fourth or bound side 76 adjacent and parallel to the double folded edge of the insert 10', clearly the catalog may be oriented in any direction relative to the insert. Typically one of the outer pages 21*a*, 24*b* of the insert 10' will notify the readers of the presence of the catalog and instruct them in its use.

If it is desired to make the catalog 70 removable from the remainder of the insert 10', the two lines of severance 72 which approach the adhered fourth side 76 of the catalog 70 may be extended slightly beyond the fourth side 76 and the free ends thereof connected by an additional line of severance 78. In this manner the catalog 70 either may be used while it is still within the insert 10' by separating the catalog from the adjacent portions of sheets 22, 23, 24 only along the two lines of severance 72 or may be removed from the remainder of the insert 10' by separating the catalog 70 from the adjacent portions of sheets 22, 23, 24 along the three lines of severance 72, 78. In such a detachable version of the catalog, a six page catalog would be composed only of both sides of three consecutive sheets and not include the inner page of the remaining sheet (e.g., as illustrated, the catalog would be composed of both pages of sheets 22, 23 and 24, and not include page 21*b*).

Regardless of whether the catalog 70 is detachable from the insert 10' or not, one of the lines of severance 72 may be replaced by another edge of the insert 10'. For example, the illustrated catalog 70 may be moved or extended upwardly relative to the insert 10' until the upper line of severance 72 is replaced by the top edge of the insert 10'. The only limitation in this regard is that there is at least one line of severance defining with at least one edge of the insert all but one side of the turnable catalog sheets. Similarly, while the catalog has been illustrated as being rectangular in configuration, the catalog may be circular, polygonal or the like with an appropriate number of lines of severance and edges of the insert being employed so as to leave only a single remaining side (or portion) bound together by a line of adhesion.

Figure 10:
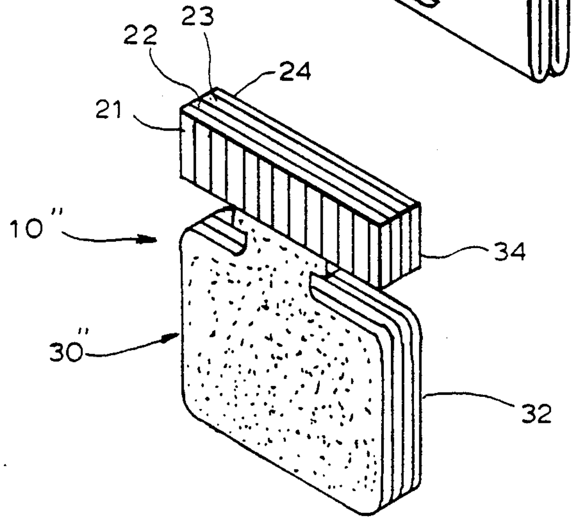

Referring now to FIG. 10, therein illustrated is a third embodiment 10" of the present invention. The third embodiment 10" is not intended for use as an insert in a book, magazine or the like, but as a free-standing member which may be given to potential customers as advertising specimens, either by hand, through the mail or the like. The container 30" is identical to the container 30' after removal thereof from the insert 10' of the second embodiment. In the third embodiment 10", as in the other embodiments 10, 10', the four sheets 21, 22, 23, 24 may be formed by folding a single piece of paper, but alternatively may be formed from originally independent, distinct sheets suitably united through the use of glues 38 and 40.

To summarize, the present invention provides a fragrance-releasing insert which is adapted to be permanently bound in a magazine, but which has a detachable fragrance-releasing portion removable from the remainder of the insert, the removal of the detachable portion from the remainder of the insert being required in order to release the fragrance so that the fragrance does not contaminate the insert or the magazine. Removal of the detachable portion does not interfere with the text or graphic features of the insert so that a plurality of such detachable fragrance-releasing portions may be used in a single insert or in a single magazine without fear of cross-contamination of the fragrances. The insert may be provided with a return postal card of acceptable thickness for mailing, the postal card being removable from the insert without substantially affecting the appearance thereof. In one embodiment of the present invention the insert is fixably bound in a magazine but has a substantial portion thereof, including the fragrance-releasing portion, removable from the remainder of the insert, while yet another embodiment of the present invention provides a fragrance-releasing device which may be used independently of a magazine, book or the like.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the invention defined herein.

I claim:

1. A scent-containing sample comprising:

(A) four at least partially overlapping sheets, including first, second, third and fourth sheets, said first, second and third sheets being at least partially cut through to define a first portion of a removable unit, said second and third sheets being at least partially cut through to define a second portion of a removable unit, said second and third sheets of said second portion being of one piece integral construction with said second and third sheets of said first portion so that said first and second portions are removable from the remainder of said sample as a unit;

(B) means for securing said first, second and third sheets of said first portion together for movement as unit;

(C) means for separable securing said second and third sheets of said second portion together for movement as a unit and for releasing a scent when said second and third sheets of said second portion are separated from each other; and (D) means for securing together said first, second, third and fourth sheets outside of the periphery of said removable unit.

2. A fragrance-releasing insert for printed matter such as a magazine or a book comprising:

(A) a leaf having four at least partially overlapping sheets, including first, second, third and fourth sheets, at least an adjacent two of said sheets including said first and second sheets being substantially cut through to define a first portion of a removable unit, at least an adjacent two of said sheets including said second and third sheets being at least partially cut through to define a second portion of said removable unit, said sheets of said second portion being of one piece integral construction with corresponding sheets of said first portion so that said first and second portions are removable from the remainder of said leaf as said removable unit;

(B) means for securing each of said sheets of said first portion together for movement as a unit;

(C) securing and releasing means for separably securing two of said sheets of said second portion together for movement as a unit and for releasing a scent when said two sheets of said second portion are separated from each other; and (D) means for securing together each of said sheets outside of the periphery of said removable unit.

3. The insert of claim 2 wherein said four sheets are defined by a single leaf having a first fold and a second fold transverse to said first fold, said first and second folds divide said leaf into overlapping quarters.

4. The insert of claim 2 wherein said securing and releasing means comprises an adhesive composition layer having rupturable microcapsules with a scented liquid within the shell of the microcapsules, the cohesive strength of said layer being less than the strength of the bond between said layer and said two sheets of said second portion of said movable unit, the tensile rupture strength of said microcapsules being such that cohesive failure of the adhesive results in breakage of said microcapsules.

5. The insert of claim 2 wherein said securing and releasing means is disposed between said two sheets of said second portion for a substantial portion of the length thereof but is absent between the free ends of said two sheets of said second portion, thereby to facilitate separation of said two sheets of said second portion by separation of said unsecured free ends.

6. The insert of claim 2 wherein the exposed side of said first sheet bears instructions for removal of said removable unit from the remainder of said leaf and separation of said two sheets of said second portion to release the scent.

7. In combination the insert of claim 2 and printed matter such as a magazine or a book, said insert being bound within said printed matter by an edge thereof.

8. The insert of claim 2 wherein said first, second and third sheets are substantially cut through to define said first portion, and said second and third sheets are at least partially cut through to define said second portion.

9. The insert of claim 8 wherein only said first, second and third sheets are substantially cut through to define said first portion, and only said second and third sheets are at least partially cut through to define said second portion.

10. The insert of claim 9 wherein said removable unit is returnable to said leaf by returning said second and third sheets of said second portion to their original relative disposition and tucking them into the opening between said first and fourth sheets created by their removal.

11. The insert of claim 9 wherein the exposed side of said first sheet of said first portion depicts a first image and the hidden side of said fourth sheet overlaid thereby depicts a second image, whereby, prior to removal of said removable unit form the remainder of said leaf, said insert presents to view from the front thereof said first image and, after removal of said removable unit from the remainder of said leaf, said remaining insert presents to view from the front thereof said second image.

12. The insert of claim 11 wherein said first and second images are substantially the same and are in superposed relationship, whereby removal of the removable unit does not visually alter the appearance of said insert from the front thereof.

13. The insert of claim 2 wherein the exposed side of said first sheet depicts an image of an open container closed by a closure, the exposed side of said first sheet of said first portion of said removable unit depicting an image of the closure for the open container and the remainder of the exposed side of said first sheet depicting an image of the open container.

14. The insert of claim 13 wherein said first portion is disposed above said second portion, said open container image represents an upright perfume bottle, said closure image represents a perfume bottle top, and said second portion of said removable unit presents the appearance of a perfume applicator, whereby removal of said removable unit from the remainder of said leaf appears to be a removal of the bottle top from the bottle and a withdrawal of the applicator from the perfume contents of the bottle.

15. The insert of claim 13 wherein the portion of said first sheet bearing said open container and closure images and the portions of the other sheets overlapped thereby are separable from the remainder of said leaf to form a separate and distinct mechanically functioning entity.

16. The insert of claim 15 wherein said image-bearing and overlapped portions are easily separable along a line of severance from the remainder of said leaf.

17. The sample of claim 15 wherein said four sheets are formed from a single leaf having a first fold and a second fold transverse to said first fold, thereby to define said four sheets.

18. The insert of claim 2 wherein at least two of said sheets including said second and third sheets define a removable postal card spaced from said removable unit, the outer surfaces of said card not being secured to any sheet not defining said card, each sheet not defining said card having adjacent an edge of said insert a weakened region overlying said card and adapted to be removed with and to facilitate removal of said card from the remainder of said leaf.

19. The insert of claim 18 wherein the areas of said weakened regions of said first and fourth sheets are small relative to the areas of said first and fourth sheets, respectively, and the appearances of said first and fourth sheets are substantially unchanged by removal of said card and said weakened regions from the remainder of said leaf.

20. The insert of claim 18 wherein said weakened regions are adjacent free edges of said sheets.

21. The insert of claim 18 wherein said second and third sheets together define said card.

22. The insert of claim 21 wherein the portions of said second and third sheets together defining said card are adhered together to form a double sheet thickness.

23. The insert of claim 2 wherein each of three consecutive sheets, including one of said first and fourth sheets, has at least one line of severance defining with at least one edge of the insert all but one edge of three turnable sheets of a multipage catalog, said catalog being spaced from said removable unit and having its sheets adhered together at said one edge.

24. The insert of claim 23 wherein said three consecutive sheets are said second, third and fourth sheets.

25. The insert of claim 23 wherein each of said three consecutive sheets has an additional line of severance intermediate said one edge of said catalog sheets and the remainder of said insert, whereby said catalog is removable from the remainder of said insert.

26. The insert of claim 23 wherein said catalog is a six page catalog excluding the outer pages of said insert.

27. The insert of claim 26 wherein said catalog includes the inner page of the other of said first and fourth sheets.

* * * * *